United States Patent [19]
Wilcox

[11] Patent Number: 5,136,599
[45] Date of Patent: Aug. 4, 1992

[54] APPARATUS AND METHOD FOR INCREASING THE BANDWIDTH OF A LASER BEAM

[75] Inventor: Russell B. Wilcox, Oakland, Calif.

[73] Assignee: The United States of America as represented by the Department of Energy, Washington, D.C.

[21] Appl. No.: 664,700

[22] Filed: Mar. 5, 1991

[51] Int. Cl.[5] .............................................. H01S 3/10
[52] U.S. Cl. ....................................... 372/26; 372/18; 372/28; 372/32; 385/31; 385/32; 385/39; 385/50
[58] Field of Search ................... 372/26, 28, 6, 32, 18; 385/31, 32, 39, 42, 50, 15

[56] References Cited

U.S. PATENT DOCUMENTS

| | | | |
|---|---|---|---|
| 3,297,875 | 1/1967 | Garwin et al. | 359/195 |
| 3,537,020 | 10/1970 | Anderson | 307/42.5 |
| 3,646,458 | 2/1972 | Firestar | 307/425 |
| 3,875,422 | 4/1975 | Stolen | 307/430 |
| 4,344,042 | 8/1982 | Hon | 330/4.3 |
| 4,635,263 | 1/1987 | Mollenauer | 372/3 |
| 4,761,050 | 8/1988 | Byron | 385/16 |
| 4,784,450 | 11/1988 | Jain et al. | 307/430 |
| 4,817,101 | 3/1989 | Wyeth et al. | 372/32 |
| 4,853,933 | 8/1989 | Blow et al. | 372/18 |
| 4,904,041 | 2/1990 | Izadpanah | 385/42 |
| 4,906,949 | 3/1990 | Rocholle et al. | 307/425 |
| 4,928,282 | 5/1990 | Barthelemy et al. | 372/18 |
| 4,952,059 | 8/1990 | Desurvire et al. | 356/350 |
| 4,962,987 | 10/1990 | Doran | 385/122 |
| 4,973,122 | 11/1990 | Cotter et al. | 385/50 |

OTHER PUBLICATIONS

Nakazawa et al., "Raman amplification in 1.4–1.5 μm spectral . . ." J. Opt. Soc. Am. B., vol. 2, No. 4, pp. 515–521, Apr. 1985.
Agrawal et al., "Optical Wave Breaking and Pulse Compression . . ." Lett., vol. 14, No 2, pp. 137–139, Jan. 15, 1989.
Alfano et al., "Cross-phase Modulation and Induced . . .", J. Opt. Soc. Am. B., vol. 6, No. 4, pp. 824–829, Apr. 1989.
Alfano et al, "Self, Cross, and Induced-Phase Modulations . . . ", IEEE J. Quantum Elec., vol. 24, No. 2, pp. 351–364, Feb. 1988.
Baldeck et al., "Induced-Frequency Shift of Copropagating . . ", Appl. Phys. Lett., vol. 52, No. 23, pp. 1939–1941, Jun. 6, 1988.

(List continued on next page.)

Primary Examiner—Georgia Y. Epps
Attorney, Agent, or Firm—Miguel A. Valdes; Henry P. Sartorio; William R. Moser

[57] ABSTRACT

A method and apparatus using sinusoidal cross-phase modulation, provides a laser pulse having a very broad bandwidth while substantially retaining the input laser's temporal shape. The modulator may be used in a master oscillator system for a laser having a master oscillator-power amplifier (MOPA) configration. The modulator utilizes a first laser providing an output wavelength $\lambda$ and a second laser providing an output wavelength shifted by a small amount to $\lambda + \Delta\lambda$. Each beam has a single, linear polarization. Each beam is coupled into a length of polarization-preserving optical fiber. The first laser beam is coupled into the optical fiber with the beam's polarization aligned with the fiber's main axis, and the second beam is coupled into the fiber with its polarization rotated from the main axis by a predetermined angle. Within the fiber, the main axis' polarization defines an interference beam and the orthogonal axis' polarization defines a signal beam. In the interference beam, the first laser beam and the parallel polarized vector component of the other beam interfere to create areas of high and low intensity, which modulates the signal beam by cross phase modulation. Upon exit from the optical fiber, the beams are coupled out and the modulated signal beam is separated out by a polarization selector. The signal beam can be applied to coherence reducing systems to provide an output that is temporally and spatially incoherent.

20 Claims, 3 Drawing Sheets

OTHER PUBLICATIONS

Chaffee et al., "Temporally Smooth Broadband Pulses Obtained . . . ", LLNL pub. UCRL-99999, Mar. 8, 1989.

Islam et al., "Cross-Phase Modulation in Optical Fibers", Optics Lett., vol. 12, No. 8, pp. 625–627, Aug. 1987.

Lehmberg et al., "Use of Induced Spatial Incoherence . . . ", Optics Comm., vol. 46, No. 2, pp. 27–31, Jun. 1, 1983.

Lehmberg et al., "Theory of Induced Spatial Incoherence", J. Appl. Phys., vol. 62, No. 7, pp. 2680–2701, Oct. 1, 1987.

Morioka et al., "Demonstration of Chirping Manipulation . . . ", Elc. Lett., vol. 25, No. 10, pp. 646–648, May 11, 1989.

Skupsky et al., "Improved Laser-Beam Uniformity Using the . . . ", J. Appl. Phys. vol. 66, No. 8, pp. 3456–3462, Oct. 15, 1989.

APPARATUS AND METHOD FOR INCREASING THE BANDWIDTH OF A LASER BEAM

The U.S. Government has rights in this invention pursuant to Contract No. W7405-ENG-48 between the U.S. Department of Energy and the University of California for the operation of Lawrence Livermore National Laboratory.

BACKGROUND OF THE INVENTION

1. Field of the Invention

The present invention relates to modulation of radiation in optical fibers. More specifically, the present invention relates to production of a sinusoidally modulated laser beam by cross phase modulation of light in an optical fiber.

2. Description of Related Art

Laser radiation has application in a wide variety of disciplines, such as communications, medicine, the military, research, and any other field where directed electromagnetic radiation is an advantage. The light produced from a laser has many known applications, and it is reasonable to expect that many applications of the laser have yet to be discovered.

Some laser uses require phase modulation of the laser beam for efficient operation. As an example, high power lasers, which may comprise a number of lasers or power amplifiers connected together, can benefit from a phase modulated laser beam. In typical high power lasers, a "seed", or "master" oscillator generates a laser output which is provided to one or more power amplifiers. This type of configuration may be termed a "MOPA" (Master Oscillator-Power Amplifier) configuration. The seed oscillator may provide a coherent beam (constant phase) of collimated light, or it may provide an incoherent beam (random phase) to the following power amplifiers.

If a high degree of coherence of the output beam is not required, incoherent light within the laser system may be advantageous. Since totally incoherent light has a random spatial and temporal phase, there are no diffraction or interference patterns formed. As a result, there would be no areas where the localized intensity may vary greatly from the average intensity, and thus the laser could operate close to its damage threshold. Phase modulation can be useful in creating an incoherent beam.

A common type of phase modulation is a simple periodic sinusoidal modulation. This type is common because it can be accomplished using simpler hardware than other types of modulation. To create simple sinusoidal modulation, the modulating element may be an electro-optic crystal driven by a sinusoidal RF voltage. The electro-optic crystal changes its index of refraction according to the applied voltage. However, large bandwidths and high modulation frequencies are difficult to accomplish with an electro-optic crystal due to the limitations of electronic RF generators. Expensive, high power microwave generators have been built for this purpose; however, the electronics acts as a basic limit on the modulation frequency and the amount of bandwidth expansion that can be obtained using electro-optic crystals.

A laser beam that has been phase modulated has a broader bandwidth. A wide bandwidth means a wide variation from the pulse's center wavelength. A laser beam with a broad bandwidth may also be useful for extracting energy from inhomogeneously broadened amplifier media, where different wavelengths are amplified by different excited atoms. Extracting energy from more of the atoms can result in higher amplifier efficiency.

As mentioned above, phase modulation can be useful in creating an incoherent beam. Phase modulation itself imparts a certain bandwidth to a beam, but the beam is still spatially coherent. Various systems have been developed at major laboratories for converting a pulse of spatially coherent light into a pulse of incoherent light. These systems require that the pulse have a certain finite bandwidth for optimal incoherence conversion. Each system has different bandwidth requirements. For example, a system developed at the University of Rochester—Smoothing by Spectral Dispersion (SSD)—requires a 2 Å to 4 Å bandwidth (FWHM), while a system developed at the Naval Research Labs—Induced Spatial Incoherence (ISI)—requires a 20 Å to 30 Å bandwidth (FWHM). The ISI system is described in an article by R. H. Lehmberg and S. P. Obenschain, "Use of Induced Spatial Incoherence for Uniform Illumination of Laser Fusion Targets", *Optics Communications*, Vol. 46, No. 1, pp. 27-31, Jun. 1, 1983, and in another article by Lehmberg et al., "Theory of Induced Spatial Incoherence", *J. Appl. Phys.*, Vol. 62, No. 7, pp. 2680-2701, Oct. 1, 1987. The SSD system is described in an article by Skupsky et al., "Improved Laser-Beam Uniformity Using the Angular Dispersion of Frequency-Modulated Light", *J. Appl. Phys.*, Vol. 66, No. 8, pp. 3456-3462, Oct. 15, 1989.

Significant applications exist for high power incoherent light. One such application is inertial confinement fusion, where total incoherence of laser light on target may provide significantly improved efficiency in coupling the beam to the target. Such an application requires that the output laser beam or beams be both spatially and temporally incoherent. In practice, temporal incoherence alone can be obtained by amplifying broadband laser light with a laser amplifier chain.

In a laser system each material through which the laser passes has a damage threshold which describes the peak electric field amplitude or intensity of the laser pulse that can pass through the system without damage to the components. Average power output from the laser is severely limited by rapid intensity fluctuations. Therefore, to avoid damage to the components while increasing average output power, time fluctuations in intensity should be minimized. Minimizing (i.e., smoothing) the peak intensity fluctuations of a temporally incoherent pulse over time can provide a high average power to the target, because the pulse can propogate through the system at an average intensity just below the damage threshold.

Spatial incoherence of the light may be required for certain target irradiation experiments related to laser-driven inertial confinement fusion (ICF) of deuterium and deuterium/tritium filled spherical target shells. It is now understood in the ICF field that laser irradiation non-uniformity on targets must be less than a 1% root-mean-squared (rms) deviation from the average intensity over the target surface. Focussed radiation from today's solid-state or gas laser systems can not achieve this degree of intensity uniformity on target. In addition, local laser radiation "hot-spots" on target cause many undesirable light scattering instabilities in the under-dense coronal plasma surrounding the target sphere. These plasma instabilities cause severe scattering of the incoming laser light away from the target, causing further radiation and plasma nonuniformities, thereby preventing target compression and nuclear fusion.

It would be advantageous to have a laser system that can provide a specific bandwidth reliably and conveniently while maintaining a smooth temporal pulse shape. It would be a further advantage if the bandwidth could be widened in an amount beyond that obtainable by electro-optic crystal modulation. For research using these and other methods, it is desirable to be able to conveniently and continuously vary the bandwidth of the pulse.

For other applications, such as laser pulse compression, it is desirable to have a pulse that has a broad bandwidth while retaining a single temporal and spatial mode. It is advantageous if the pulse has a spectral content that is approximately evenly distributed around the central wavelength.

For some uses, a temporally smooth laser pulse is an advantage. A pulse is temporally smooth if it has an intensity as a function of time that does not change abruptly; i.e., the pulse has an average intensity that is close to its peak intensity. Thus, it would be a further advantage if a temporally smooth laser pulse can be broadened in wavelength while retaining its temporally smooth shape, for safe and predictable laser operation at high power.

SUMMARY OF THE INVENTION

The present invention comprises a novel method and apparatus that can input a laser pulse and provide a laser output beam having a broad bandwidth by sinusoidal cross-phase modulation, while substantially retaining the temporal shape of the input pulse. Although it has many uses, the present invention may have use as a portion of a master oscillator system for a laser having a master oscillator-power amplifier (MOPA) configuration.

The present invention comprises an optical modulation apparatus that includes a first laser producing a first laser beam with a wavelength centered at $\lambda$ and a second laser producing a second laser beam with a slightly different wavelength $\lambda + \Delta\lambda$. Each beam has a single, linear polarization. Each beam is coupled into a length of polarization-preserving (birefringent) optical fiber that has two principal propagation axes, referred to as the main axis and the orthogonal axis. The first laser beam is coupled into the optical fiber with the beam's polarization aligned directly with the main axis of the fiber. The second beam is coupled into the fiber with its polarization rotated from the main axis by a predetermined angle, and therefore, in the fiber, the second beam has a first polarization component along the main axis, and a second polarization component along the orthogonal principal axis.

As the two beams travel through the material, the polarization preserving properties of the optical fiber maintain the respective polarizations. Within the fiber, the main axis' polarization defines an interference beam and the orthogonal axis' polarization defines a signal beam. In the interference beam, the first laser beam and the parallel polarized vector component of the other beam interfere to create areas of high and low intensity. The signal beam comprises the vector component of the second beam that is polarized along the orthogonal axis. The signal beam is modulated in the fiber by the intensity of the co-propagating interference beam, specifically by a process known cross phase modulation. Cross phase modulation is caused by third order, intensity dependent variations in the fiber's index of refraction. In the optical fiber, the two beams can interact over a long distance at high intensity in order to produce the desired effect. As a result of the beam's interaction with the fiber, in the present invention the phase of the signal component is varied by the intensity of the pumping component and pump beam; the nature of the intensity variations caused by the interference induces a bandwidth variation of the signal beam. The amount of bandwidth variation is dependent upon the frequency difference between the two lasers, the intensity of the two beams in the fiber, and the interaction length of the two beams in the optical fiber.

At an exit from the optical fiber, the beams are coupled out and the modulated signal component is separated out by a polarization selector that selects the principal axis orthogonal to the main axis of the optical fiber. The modulated signal beam now has a wider bandwidth, and its shape remains smooth in time. This signal beam can be applied to coherence reducing systems such as the Rochester system—Smoothing by Spectral Dispersion (SSD), or the Naval Research Labs system—Induced Spatial Incoherence (ISI). The different bandwidths required by these different incoherence inducing systems can be obtained by varying the frequency difference between the two lasers, the intensity of the two beams in the optical fiber, and the interaction length of the two beams within the optical fiber.

The present invention has application in any laser system having a MOPA (master oscillator-power amplifier) configuration, such as those typically used for high-power laser systems. Furthermore, the optical cross-phase modulation method may have application in laser fusion, spectroscopy, multiple wavelength lasers, and optical physics. As a source of broadband laser radiation, the present invention may have use in extracting more energy from an inhomogeneously broadened amplifier. Other uses include communications, using an FM carrier, and microwave/optical mixing and detection. Also, the present invention may be used for generating multiple wavelengths from one or two oscillators. These wavelengths may be continuously tunable, and can lie outside the bandwidth of the oscillators. The present invention could also be used with other equipment to generate ultra high frequency trains of short pulses using phase control and pulse compression techniques.

DETAILED DESCRIPTION OF THE INVENTION

The following description first describes the invention in very general terms, with reference to the figures. Subsequent to the general description, a specific description describes more particular aspects, again with reference to the figures. Throughout the description and the figures, like parts are designated with like numerals.

General Description

In general, the present invention comprises a method for modulating a laser beam in a polarization preserving optical fiber. The modulation is produced by a sinusoidal interference pattern along one of the principal axes of the fiber, which modulates the laser energy having the orthogonal polarization. The output beam has broadened bandwidth with a temporal shape substantially unchanged over the input beam. Using the present invention, the bandwidth may be broadened by a larger amount than previously obtainable.

Figure 1:
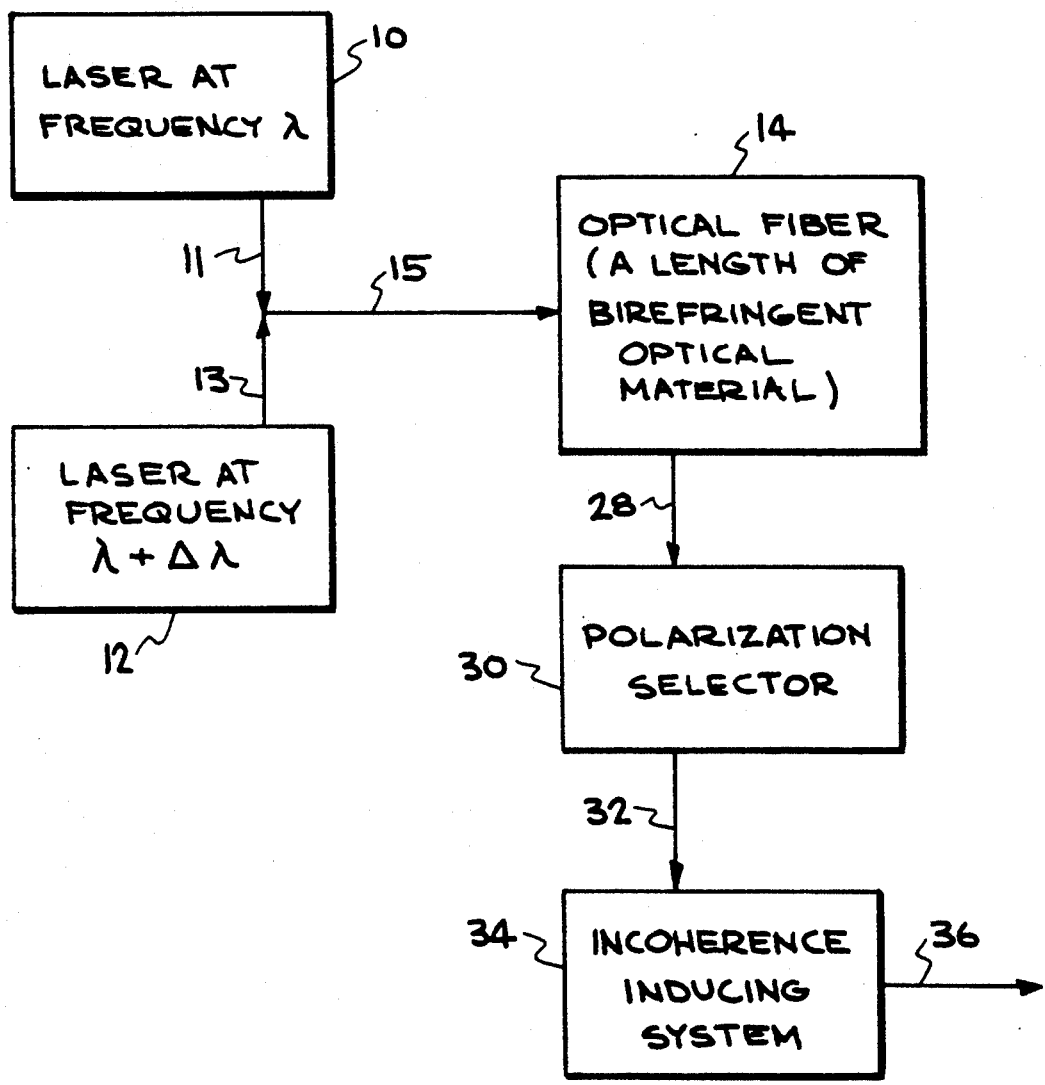
FIG. 1 is a block diagram of the present invention.

The block diagram of FIG. 1 illustrates the present invention. A narrowband single mode laser 10 produces a laser beam 11 (which may be a pulse) with wavelength of $\lambda$ and substantially a single linear polarization. A second narrowband single mode laser 12 produces a laser beam 13 (which may be a pulse) with a slightly shifted wavelength ($\lambda + \Delta\lambda$) and a substantially single linear polarization. The beams 11,13 are combined into a single beam 15, and then coupled into an optical fiber 14 of glass or crystalline material having polarization preserving properties. In order to have polarization-preserving properties, the optical fiber 14 is birefringent, which means that the index of refraction along one axis is different than the index of refraction along the other axis. Furthermore, the polarization preserving optical fiber 14 has non-linear indices of refraction, which means that the index of refraction depends on the intensity of the optical beam propagating through it. Materials other than optical fibers have been shown to have birefringent properties, and therefore other birefringent materials may be used as long as they have nonlinear indices of refraction; however, the long interaction length afforded by the optical fiber 14 makes it the preferred material.

Figure 3:
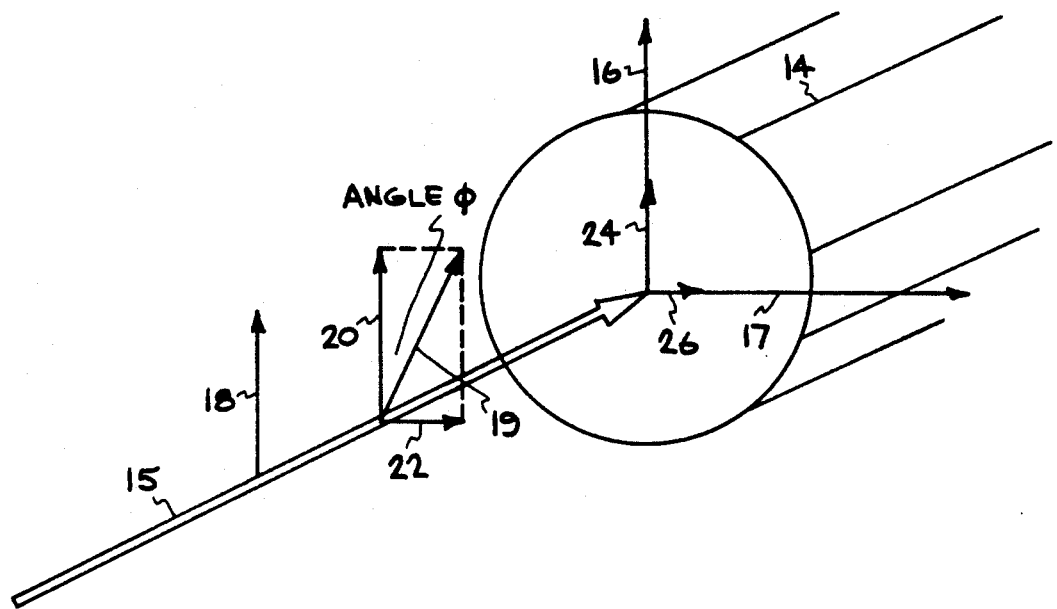
FIG. 3 illustrates a beam coupling into an optical fiber, illustrating the polarization of the beam components and their relationship to the optical fiber.

As illustrated and explained with reference to FIGS. 1 and 3, the optical fiber 14 defines two orthogonal principal axes, a principal axis 16 and an orthogonal principal axis 17. For purposes of clarity in explanation, the principal axis 16 will be termed the main axis 16, and the orthogonal principal axis 17 will be termed the orthogonal axis 17. In the beam 15, which is a combination of the beams 11,13, the direction of the linear polarization of the beam 11 is represented by the arrow 18, and the direction of the linear polarization of the beam 13 is represented by the arrow 19. The polarization 18 of the first laser beam 11 is coupled into the fiber 14 so that it is aligned directly with the main axis 16, and it will maintain this polarization as it propagates along the length of the fiber 14. However, the polarization 19 of the frequency-shifted beam 13 is rotated by an angle $\phi$ with respect to the main axis 16 and also with respect to the polarization 18. The angle $\phi$ may vary from a fraction of a degree to almost perpendicular. With that angle $\phi$, the frequency-shifted beam 13 has a first polarization vector component 20 that will propagate along the main axis 16, and a second polarization component 22 that will propagate along the orthogonal axis 17. Thus, along the main axis 16 in the fiber 14, the first laser beam 11, and the polarization component 20 lying along the main axis 16 will co-propagate in an interference beam 24 (represented by the arrow 24). As is well known, two co-propagating waves that have a slightly different wavelength will interfere, or "beat". As a result, along the length of the fiber 14, there will be areas of greater and lesser intensity corresponding to the beats. The remaining component 22 becomes a signal beam 26 (represented by the arrow 26).

As the two beams 24,26 travel through the material, the polarization preserving properties of the optical fiber 14 maintain the respective polarizations of the beams 24,26. Due to the birefringence of the polarization preserving optical fiber 14, the different indices of refraction will cause the beams 24,26 to travel at different speeds in the fiber 14. If the beams 24,26 comprises pulse of finite length, then these pulses will "walk away" from each other during their travel throughout the fiber 14. Preferably, the interference beam has a high power, so that as the signal beam 26 travels along the orthogonal axis 17, it is modulated by the co-propagating interference beam 24 before the beams 24, 26 substantially separate. The modulation between the two axes 16, 17 in the optical fiber 14 is caused by a non-linear process known as cross-phase modulation.

Cross phase modulation is an effect whereby intensity variations in the beam 15 propagating through the optical fiber 14 directly vary the fiber's refractive index, thereby causing phase variations in the signal beam 26. Specifically, these intensity variations in the interference beam 24 cause phase variations of the signal beam 26. In the preferred embodiment, the large number of phase variations induced by the interference beam changes the bandwidth of the signal beam 26. Thus, by increasing the peak intensities of the interference beam 24, an increase in the bandwidth is produced in the signal beam 26.

Figure 4:
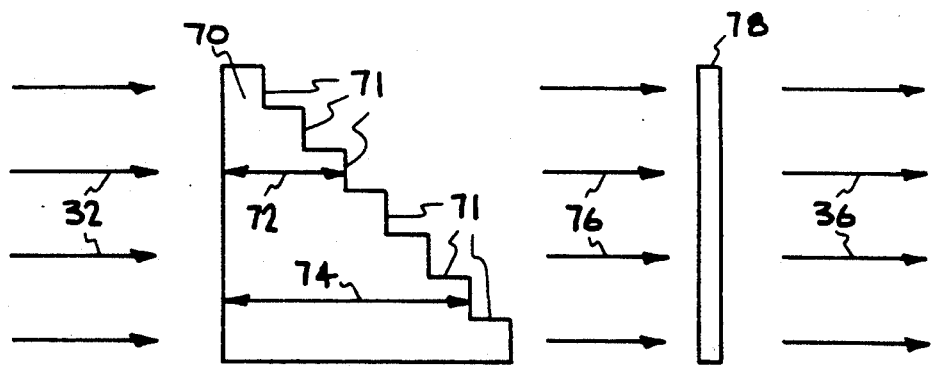
FIG. 4 illustrates an optical system for producing incoherent light.

Referring to FIG. 1, a combined modulated output 28 from the optical fiber 14 comprises the interference beam 24, and the signal beam 26 that has been modulated, propagating along orthogonal polarizations. The output 28 is applied to a polarization selector 30 that transmits only the modulated polarization, to output a modulated signal beam 32. The polarization selector 30 may, for example, comprise a polarized filter. The modulated signal beam 32 has a broad bandwidth that is substantially determined by the difference frequency $\Delta\lambda$, the intensity of the beams 11,13, and the interaction length of the interference beam 24 and the signal beam 26 in the optical fiber 14. The modulated signal beam 32 may then be used as desired. For example, the signal beam 32, having a broadened bandwidth, can be applied to a system 34 for reducing spatial coherence, such as the ISI, or SSD, to provide a spatially incoherent beam 36 that has a smooth intensity variation over time. FIG. 4 illustrates a simple system for reducing coherence.

Specific Description

Figure 2:
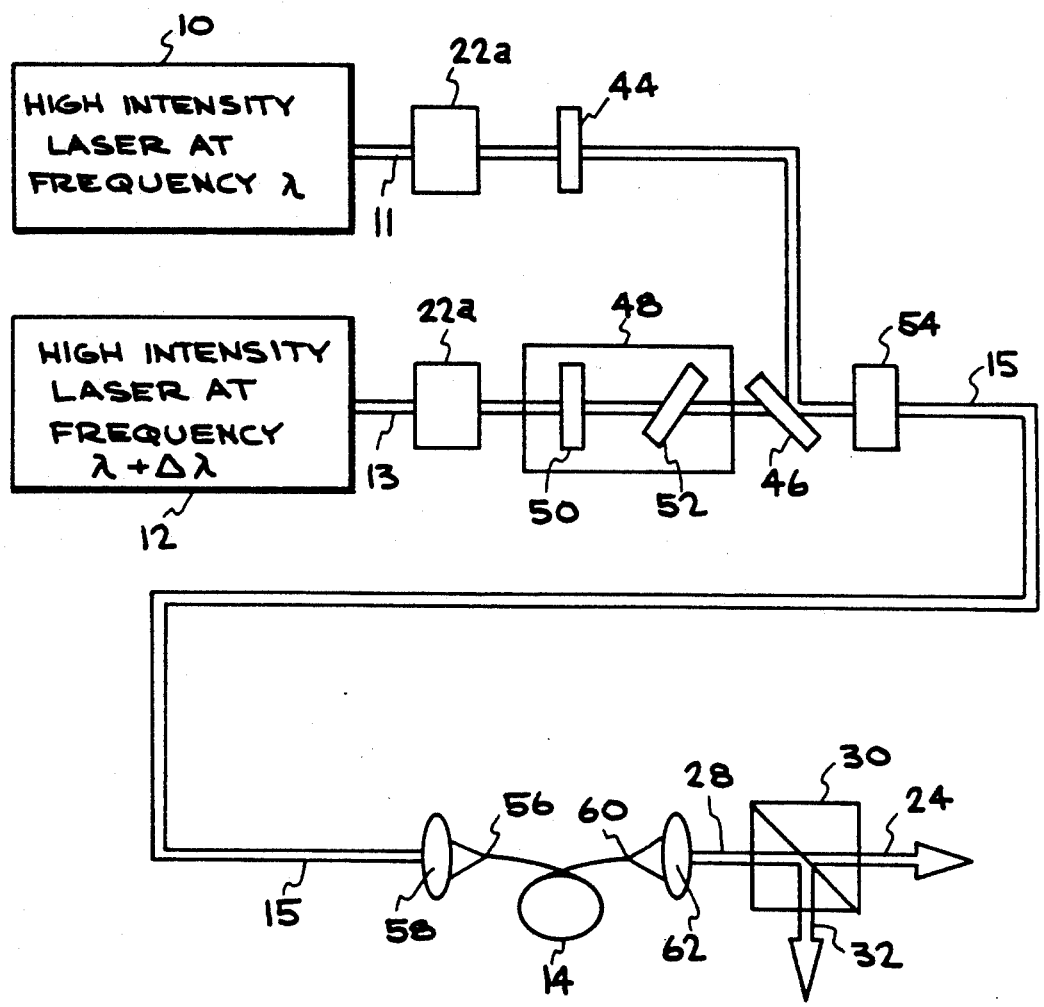
FIG. 2 illustrates an embodiment of the present invention that comprises an optical system having a broadband output that is cross-phase modulated.

The preferred embodiment of the present invention is illustrated in the schematic diagram of FIG. 2.

Each of the lasers 10,12 may be conventional narrowband, single mode pulsed lasers. In the preferred embodiment, each laser 10,12 comprises cavity mirrors, an intracavity Q-switch, and a flashlamp-pumped laser rod of neodymium-doped yttrium lithium fluoride (Nd:YLF). Each laser 10,12 may comprise a similar construction, except for a difference in the etalons. The slight wavelength shift ($\Delta\lambda$) between the lasers 10,12 can be accomplished by using an etalon that has a slightly different resonant frequency, for example the frequency may differ by 75 GHz. Preferably, each laser 10,12 includes components that produce the respective output beam 11,13 having a single linear polarization; however, additional components such as polarizers (not shown) may be conventionally utilized in the path of either of the beams 11,13 in order to more completely polarize the beams 11,13. In the preferred embodiment, the beam 11 has substantially a smooth temporal shape, i.e., an approximately constant intensity over the duration of interest which may be the pulse duration, for example. The beam 11 has substantially a single wavelength λ centered at 1.05 for Nd:YLF. The wavelength shifted beam 13 has a similar smooth temporal shape, but has substantially a single wavelength λ+Δλ. The wavelength shift Δλ may vary in a wide range from slightly greater than the bandwidth of the single mode laser 10, to some maximum value determined primarily by the chromatic dispersion of the optical fiber 14. If Δλ is too great, the interfering waves will "walk off", due to chromatic dispersion, become out of phase from each other, and negate the modulation effect. The largest Δλ so far demonstrated is 2.5Å (75 GHz), a Δλ that was limited by the experimental laser's tuning range. The amount of the wavelength shift Δλ may be positive or negative (i.e., the wavelength-shifted beam 13 may have a wavelength greater or less than the wavelength λ of the beam 11).

After exiting from the laser 10, in the preferred embodiment, the first beam 11 is applied to a pulse slicer 40, which controls the beam's intensity. In operation, the pulse slicer 40 selects a short section of a pulse in the beam 11 from laser 10. The pulse slicer is advantageous for the purpose of protecting the fiber 14 and dynamic control of the bandwidth, among other reasons. The pulse slicer 40 comprises a conventional Pockel's cell driven by a square wave electrical pulse that is provided by a conventional electric circuit. The pulse slicer 40 has purposes including limiting the signal pulse duration and/or shaping the time envelope of the signal pulse 11. For similar reasons, a pulse shaper 42 is positioned in the path of the frequency-shifted beam 13. In operation, the pulse slicers 40,42 are synchronized by a conventional electronic timing control system (not shown), so that the first beam 11 and the wavelength-shifted beam 13 co-propagate for a substantial period of distance through the optical fiber 14. In the preferred embodiment, the lasers 10,12 are operated in the pulsed mode as a result of design constraints imposed by the solid state laser material. However the principles of the present invention can be applied with continuously operating (cw) lasers, and therefore in other embodiments, one or both of the lasers 10,12 may comprise a cw laser.

In the beampath of the first beam 11, a conventional half-wave plate 44 is positioned to provide control over the direction of the linear polarization of the beam 11. The half-wave plate 44 can be rotated to change the polarization angle of the beam 11 before it is combined with the beam 13 at a beamsplitting mirror 46. Other types of polarization rotating devices may be used, such as twisted birefringent fibers.

In the beampath of the wavelength-shifted beam 13, a variable attenuator 48 is positioned to provide control over the intensity of the beam 13. The variable attenuator 48 may comprise a waveplate 50 and a polarizer 52 which are positioned conventionally to provide the desired attenuation.

The first laser beam 11 and the wavelength-shifted beam 13 are combined by a polarization maintaining beam combiner such as a conventional beamsplitting mirror 46 to provide the combined beam 15. Other devices may be used such as a polarization preserving fiber couplers. With reference to FIGS. 2 and 3, the half-wave plate 44 may be rotated to adjust the angle φ between the polarization 18 of the first beam 11 and the polarization 19 of the wavelength-shifted beam 13. The angle φ may be selected to be between a fraction of a degree and almost perpendicular, preferably the angle φ is at least a few degrees. In experiments, good results have been obtained with an angle φ selected to be about 45°. A conventional half-wave plate 54 is provided in the beampath of the combined beam 15 in order to facilitate alignment of the polarization of the beam 15 with respect to the axes 16,17 in the optical fiber 14. The combined beam 15 is coupled into an entrance 56 of the optical fiber 14 by a conventional coupler 58, such as a microscopic lens. FIG. 3 illustrates the respective linear polarizations 18,19 of the two beams 11,13 in the relationship that they are coupled into the entrance 56 of the optical fiber 14. As discussed previously, the linear polarization 18 of the first beam 11 is aligned with the main axis 16, and, the polarization 19 of the frequency-shifted beam 13 is rotated by an angle φ with respect to the main axis 16 and also with respect to the polarization 18. Therefore, the frequency-shifted beam 13 has the polarization vector component 20 that will propagate along the main axis 16, and the second polarization component 22 that will propagate along the orthogonal axis 17. Thus, along the main axis 16 in the fiber 14, the first laser beam 11, and the polarization component 20 lying along the main axis 16 will co-propagate in the interference beam 24 (represented by the arrow 24). As is well known, two co-propagating waves that have a slightly different wavelength will interfere, or "beat". As a result, along the length of the fiber 14, there will be areas of greater and lesser intensity corresponding to the beats. Ideally, the intensity of the interference beam 24 will vary sinusoidally from zero to a value greater than the maximum intensity of either beam 11,13. The remaining component 22 becomes the signal beam 26 (represented by the arrow 26).

The amount of coupling by cross-phase modulation between the interference beam 24 and the signal beam 26 is partially determined by their interaction length, i.e., the length of optical fiber 14 over which they co-propagate. Thus, the optically optical fiber 14 has a length chosen so that a sufficient strength of cross-phase modulation is obtained during the optical interaction of the interference beam 24 and the signal beam 26 in the optical fiber 14. Furthermore, if the beams 11,13 are pulsed, they will tend to "walk away" from each other in the fiber 14 due to the birefringence of the fiber 14, and therefore, the length of the pulses in the beam 11,13 must be selected accordingly.

The optical fiber 14 may comprise an optical fiber, or another media for nonlinear optical interaction. In the preferred embodiment, the optical fiber 14 includes a polarization-preserving optical fiber having a length of ten meters; the actual length is a design consideration that is dependent upon criteria such as material properties and the average intensities of the beams 11,13.

As applied to the present invention, cross-phase modulation is an effect whereby intensity-dependent differences in the index of refraction are induced in the optical fiber 14 by the interference beam 24. The induced index of refraction variations on the signal beam 26 give rise to phase modulation of the electric field envelope of the signal beam 26, and are linearly proportional to the degree of intensity variation of the interference beam 24. The phase variations in the signal beam 24 have the effect of increasing its bandwidth, among other effects.

Theoretically, the temporal envelope of the signal beam 26 is unaffected, because the interaction between the interference beam 24 and the signal beam 26 is phase modulation, and not amplitude modulation. The modulated signal beam 32 (FIG. 1) can maintain a single temporal mode and smooth-in-time temporal variation, even while carrying substantial phase-induced bandwidth and temporal incoherence.

In the preferred embodiment, an increase in the average power of the interference beam 24 causes a linear increase in the overall bandwidth of the signal beam 26.

At an exit 60 from the optical fiber 14, the modulated output beam 28 is coupled out of the fiber 14 by a conventional optical coupler 62, such as a microscope objective lens. The combined beam 28 which is coupled out comprises the interference beam 24 and the modulated signal beam 32. The respective polarizations of the beams 24,26 have been maintained in accordance with their original coupling into the optical fiber 14 by the polarization preserving effects of the optical fiber 14. The combined beam 28 is applied to a polarization selector 30 such as a thin dielectric film polarizer, and the modulated signal beam 32 exits from one angle while the interference beam 24 exits from another angle. Thus, the modulated signal beam 32 is available for further purposes as needed. For example, the modulated signal beam 32 can be amplified in a high power laser chain.

In the preferred embodiment, the modulated signal beam 32 has a large bandwidth with a smooth spectral content, and a shape over time that is smoothly varying in intensity. The modulated signal beam 32 can thus be applied to the incoherence inducing system 34 (FIG. 1) for inducing spatial incoherence, such as the above mentioned ISI and SSD systems. Following processing into a temporally incoherent form, the output 36 may be used as desired. For example, a pulse from the output 36 can be used as the seed pulse for a high-power laser such as the NOVA laser system. As another example, the pulses in the beam 36 may be applied to beam compression, using dispersive elements in a configuration to provide short, high power pulses.

FIG. 4 illustrates a simple coherence reducing system. The modulated signal beam 32 is processed by an echelon element 70 that causes a time delay between different spatial positions of the beam 32. The echelon element 70 may comprise a material of constant refractive index that has a series of steps 71. These steps cause the pathlengths of adjoining positions of the beam 32 to differ; it can be seen that the pathlength 72 is shorter than the pathlength 74. Thus, the portion of the beam 32 travelling the pathlength 72 is delayed less that the portion travelling the pathlength 74. The time-delayed beam 76 is then applied to a phase scrambling element 78, such as the distributed phase plate described in the Skupsky article cited previously. The phase scrambling element 78 causes a random change in the phase of the beam. As a result of the phase scrambling element 78 and the echelon 70, the output 36 is highly incoherent. In other embodiments, the echelon element 70 may comprise reflective surfaces positioned to provide similar time delays.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

I claim:

1. An optical modulation apparatus, comprising:
    means for providing a first laser beam centered at a wavelength $\lambda$;
    means for providing a second laser beam centered at a wavelength $\lambda + \Delta\lambda$;
    a polarization preserving optical fiber comprising two polarization preserving axes, including a main axis and an orthogonal axis extending from an optical entrance to an optical exit;
    a means for coupling a single polarization of the first laser beam into the entrance of the optical fiber along the main axis;
    a means for coupling a single polarization of the second laser beam into the entrance of the optical fiber at a predetermined nonperpendicular angle to the main axis;
    a means for coupling an output beam from the optical exit of the optical fiber; and,
    a means for selecting a single polarization of the output beam from the optical fiber, so that the polarization selected corresponds to the polarization of the orthogonal axis of the optical fiber.

2. The optical modulation apparatus as claimed in claim 1, wherein the means for coupling the second laser beam into the fiber comprises means for coupling the polarization at an angle between 10° and 80° with respect to the main axis.

3. The optical modulation apparatus as claimed in claim 1, wherein the first laser and the second laser are pulsed lasers, and wherein the apparatus further comprises means for synchronizing the pulses coupled into the optical fiber so that they travel through said material approximately simultaneously.

4. The optical modulation apparatus as claimed in claim 1, wherein $\Delta\lambda$, the difference between the center wavelengths of the first laser beam and the second laser beam differ by a figure within a range between 0.5 Å and 10 Å.

5. The optical modulation apparatus as claimed in claim 1, further comprising a coherence reducing system, and the modulated signal beam is applied to the coherence reducing system to provide an output that is spatially and temporally incoherent.

6. An optical modulation apparatus for modulating a signal beam with an interference beam, comprising:
    means for providing a first laser beam centered at a wavelength $\lambda$, said first beam having substantially a single linear polarization;
    means for providing a second laser beam centered at a wavelength $\lambda + \Delta\lambda$, said second beam having substantially a single linear polarization;
    a polarization preserving beam combiner for combining the first beam and the second beam into a single combined beam wherein the polarization of said first beam is positioned at a selected angle nonperpendicular to the polarization of the second beam, so that the combined beam has a first polarization that includes energy from the first beam and a first portion of the energy of the second beam, and a second, orthogonal polarization that includes a second portion of the energy of the second beam;
    an optical fiber comprising two polarization preserving axes, including a main axis and an orthogonal axis extending from an optical entrance to an optical exit;

a coupler for coupling said combined beam into the entrance of the optical fiber;

an output coupler for coupling the beam output from the exit of the optical fiber; and, a polarization selector positioned in the output beam to select the polarized portion of the output beam exiting from the orthogonal axis.

7. The optical modulation apparatus as claimed in claim 6, wherein $\Delta\lambda$, difference between the center wavelengths of the first laser beam and the second laser beam differ by a figure within a range between 0.5 Å and 10 Å.

8. The optical modulation apparatus as claimed in claim 6, further comprising a half-wave plate positioned in the first laser beam, said half-wave plate being rotatable to adjust the linear polarization of the first beam before it is combined by the beamsplitting mirror into the combined beam.

9. The optical modulation apparatus as claimed in claim 6, further comprising a variable attenuator positioned in the second laser beam, so that the intensity of the second laser beam can be adjusted by varying the attenuation.

10. The optical modulation apparatus as claimed in claim 6, wherein the first laser beam means produces a pulse of laser energy, and the second laser beam means also produces a pulse of laser energy.

11. The optical modulation apparatus as claimed in claim 10, further comprising means for synchronizing the pulses in the first and the second laser beams so that the pulses can be adjusted to propagate substantially simultaneously through the optical fiber.

12. The optical modulation apparatus as claimed in claim 11, wherein the synchronizing means comprises a first pulse slicer positioned in the beam path of the first laser beam before the beam combiner, and a second pulse slicer positioned in the beam path of the second laser beam before the beam combiner.

13. A method of producing broadband laser light from a narrowband source of laser light, comprising the steps of:

a. providing a length of polarization preserving optical fiber having a main optical axis and an orthogonal optical axis;

b. producing a first laser beam centered at a wavelength $\lambda$, said first beam having substantially a single linear polarization;

c. producing a second laser beam centered at a wavelength $\lambda + \Delta\lambda$, said second beam having substantially a single linear polarization;

d. combining the first and second laser beam to produce a single combined beam wherein the polarization of said first beam is positioned at a selected angle nonperpendicular to the polarization of the second beam, so that the combined beam has a first polarization that includes energy from the first beam and a first vector component of the energy of the second beam, and a second, orthogonal polarization that includes a second vector component of the energy of the second beam;

e. coupling the combined beam into the optical fiber so that the first polarization of the combined beam is aligned with the main optical axis of the optical fiber;

f. allowing the combined beam to cross-phase modulate as it travels through the optical fiber;

g. coupling the beam out from the optical fiber; and, h. selecting the polarization corresponding to the orthogonal optical axis of the optical fiber, to provide a cross-phase modulated output beam.

14. The method as claimed in claim 13, wherein in the step of producing a first laser beam centered at a wavelength $\lambda$, the first laser beam is produced to comprise a series of laser pulses.

15. The method as claimed in claim 13, wherein in the step of producing a second laser beam centered at a wavelength $\lambda + \Delta\lambda$, the second laser beam is produced to comprise a series of laser pulses.

16. The method as claimed in claim 13, wherein in the step of producing a first laser beam centered at a wavelength $\lambda$, the first laser beam is pulsed before it is coupled into the optical fiber and in the step of producing a second laser beam centered at a wavelength $\lambda + \Delta\lambda$, the second laser beam is pulsed before it is coupled into the optical fiber, and in the step of combining the first and second laser beam to produce a single combined beam, the pulses of the first laser beam and the second laser beam are synchronized so that they co-propagate through a substantial portion of the optical fiber.

17. The method as claimed in claim 13, wherein in the step of combining the first and second laser beam to produce a single combined beam, the first polarization of the combined beam comprises an interference beam created by interference between the first beam and the first portion of the second beam, and the second, orthogonal polarization of the combined beam comprises a signal beam, and in the step of coupling the combined beam into the optical fiber, the combined beam is coupled into the optical fiber so that the interference beam is aligned with the main axis.

18. The method as claimed in claim 17, wherein in the step of allowing the combined beam to cross-phase modulate as it travels through the optical fiber, the interference beam modulates the signal beam by cross-phase modulation.

19. The method as claimed in claim 18, wherein in the step of selecting the polarization corresponding to the orthogonal optical axis of the optical fiber, the modulated signal beam is selected by its polarization along the orthogonal axis.

20. The method as claimed in claim 19, further comprising a step (i) wherein the modulated signal beam is applied to an incoherence inducing system to produce a beam with reduced spatial coherence.

* * * * *